United States Patent
Schramm et al.

(10) Patent No.: US 10,369,732 B2
(45) Date of Patent: Aug. 6, 2019

(54) PROFILED SECTION, ESPECIALLY FOR A MOTOR VEHICLE, AND METHOD FOR THE PRODUCTION THEREOF

(71) Applicant: Cooper Standard GmbH, Lindau (DE)

(72) Inventors: Dominik Schramm, Wasserburg (DE); Dirk Reupert, Lindau (DE); Ronald Fritzsche, Nonnenhorn (DE)

(73) Assignee: Cooper Standard GmbH, Lindau (DE)

( * ) Notice: Subject to any disclaimer, the term of this patent is extended or adjusted under 35 U.S.C. 154(b) by 29 days.

(21) Appl. No.: 15/672,822

(22) Filed: Aug. 9, 2017

(65) Prior Publication Data

US 2018/0015651 A1 Jan. 18, 2018

Related U.S. Application Data

(62) Division of application No. 14/915,547, filed as application No. PCT/EP2014/068638 on Sep. 2, 2014, now abandoned.

(30) Foreign Application Priority Data

Sep. 2, 2013 (DE) .................. 10 2013 109 567

(51) Int. Cl.
*B29C 45/16* (2006.01)
*B29C 48/07* (2019.01)
(Continued)

(52) U.S. Cl.
CPC .......... *B29C 45/16* (2013.01); *B29C 37/0025* (2013.01); *B29C 48/07* (2019.02);
(Continued)

(58) Field of Classification Search
CPC ......... B29C 45/16; B29C 48/16; B29C 48/07; B29C 37/0025; B60J 10/74; B60J 10/16;
(Continued)

(56) References Cited

U.S. PATENT DOCUMENTS 4,314,872 A   2/1982   Schiesser
4,416,951 A   11/1983   Mesnel
(Continued)

FOREIGN PATENT DOCUMENTS

AU   2003205758 A1   9/2003
DE     1509976 A1   11/1969
(Continued)

OTHER PUBLICATIONS

International Search Report for PCT/EP2014/068638 dated Jan. 22, 2015 (English).
(Continued)

*Primary Examiner* — Brian Handville
(74) *Attorney, Agent, or Firm* — Thomas B. Ryan; Harter Secrest & Emery LLP

(57) ABSTRACT

A profile section (10) for a motor vehicle comprises a decorating portion (40), which is composed of a fiber composite material. The fiber composite material comprises an elastomer matrix made of a first elastomer and flock fibers (50). The flock fibers (50) each have a fiber length which is comprised of a first length and a second length. In addition, the flock fibers have one matrix portion embedded in the elastomer matrix and one exposed portion protruding from the elastomer matrix. The matrix portion has the first length and the exposed portion has the second length.

14 Claims, 3 Drawing Sheets

(51) Int. Cl.
    *B29C 48/16*      (2019.01)
    *B29D 99/00*      (2010.01)
    *F16J 15/02*      (2006.01)
    *B60J 10/265*     (2016.01)
    *B60J 10/16*      (2016.01)
    *B60J 10/74*      (2016.01)
    *B29C 37/00*      (2006.01)
    *B29L 31/00*      (2006.01)
    *B29L 31/30*      (2006.01)
    *B29K 105/12*     (2006.01)

(52) U.S. Cl.
    CPC .......... *B29C 48/16* (2019.02); *B29D 99/0003* (2013.01); *B60J 10/16* (2016.02); *B60J 10/265* (2016.02); *B60J 10/74* (2016.02); *F16J 15/022* (2013.01); *B29K 2105/12* (2013.01); *B29L 2031/006* (2013.01); *B29L 2031/3005* (2013.01)

(58) Field of Classification Search
    CPC ... B60J 10/265; F16J 15/022; B29D 99/0003; B29K 2105/12; B29L 2031/006; B29L 2031/3005
    See application file for complete search history.

(56) References Cited

U.S. PATENT DOCUMENTS

| | | | | |
|---|---|---|---|---|
| 5,343,609 A | * | 9/1994 | McManus | ............... B60J 10/235 264/177.17 |
| 5,943,176 A | | 8/1999 | Mertens | |
| 8,685,537 B2 | | 4/2014 | Imai et al. | |
| 2008/0012242 A1 | | 1/2008 | Brocke | |
| 2010/0276060 A1 | | 11/2010 | Abrams | ................... B05D 1/16 156/72 |
| 2011/0204671 A1 | * | 8/2011 | Baratin | .................. B60J 10/235 296/93 |

FOREIGN PATENT DOCUMENTS

| | | |
|---|---|---|
| DE | 2509515 A1 | 9/1976 |
| DE | 2623316 A1 | 12/1976 |
| DE | 3107889 A1 | 1/1982 |
| DE | 3145861 A1 | 10/1982 |
| DE | 19622342 A1 | 12/1997 |
| DE | 19711487 A1 | 10/1998 |
| DE | 19937285 A1 | 4/2000 |
| DE | 10207682 A1 | 9/2003 |
| DE | 10259843 B3 | 8/2004 |
| DE | 102010016756 A1 | 11/2011 |
| DE | 102011107137 A1 | 1/2013 |
| EP | 0794087 A2 | 9/1997 |
| EP | 1717082 A2 | 11/2006 |
| EP | 2290020 A1 | 3/2011 |
| GB | 1006620 A | 10/1965 |
| GB | 1502543 A | 3/1978 |

OTHER PUBLICATIONS

International Preliminary Report on Patentability for PCT/EP2014/068638 dated Mar. 17, 2016 (English).

Decision to Grant DE 10 2013 109 567.4 dated Jul. 30, 2015 (English).

Swicofil, Understanding the Flocking Process, May 10, 2012, obtained from https://web.archive.org/web/20120510192238/http://www.swicofil.com/flock.html.

* cited by examiner

PROFILED SECTION, ESPECIALLY FOR A MOTOR VEHICLE, AND METHOD FOR THE PRODUCTION THEREOF

TECHNICAL FIELD

The invention relates to a profile section, in particular for a motor vehicle. In addition, the invention relates to a manufacturing method for such a profile section.

BACKGROUND OF THE INVENTION

For instance, profile sections are used in the interior of motor vehicles as edge protection, or for covering the transition to the roof lining. Further locations are the A-, B-, and C-pillar of the body.

The profile section may also be used for sealing a window slot or a window pane and as a window guide for a movable window pane. In this case, the profile section is referred to as a sealing section or sealing profile.

The appearance of the profile section plays an important role in the design of the motor vehicle. In particular, textile and textile-like decorating portions are perceived as particularly high-quality.

From DE 199 37 285 A1, a duplex profile is known whose surface is at least partially covered by laminating tape. The laminating tape is a textile tape of ground thread and plush thread and consists of polyester bulk thread. The laminating tape is prestressed in the longitudinal direction of the profile and glued to a portion of the duplex profile. The laminating tape forms the decorating portion.

From EP 0 794 087 A1, a sealing strip is known, which has a fabric or textile covering. The fabric covering extends to the outer surface of a decorating lip and forms the decorating portion. The fabric or textile covering is glued to the rubber body underneath.

A sealing section is also known from DE 196 22 342 A1 and is referred to as an edge protection or sealing profile. The sealing profile comprises a mounting portion U-shaped in cross-section, which can be clamped on a flange of the motor vehicle. The sealing profile has an enwrapping textile cover. The textile cover is on the one hand provided for the design of the profile section, and on the other hand it serves as a sliding surface, for instance for a motor vehicle window. In high wear areas, the textile cover is additionally provided with a protective layer.

From DE 10 2010 016 756 A1, a covering lip for the entrance areas of motor vehicles is known which has a rubber profile. The covering lip has a decorating portion of thermoplastic elastomer, which is provided with a sliding finish.

From EP 1 717 082 A2, a sealing strip is known, which has a structure and is coated with a structured finish.

DE 10 2011 107 137 A1 discloses an extruded plastic profile which has a delayed heat release rate under thermal load. To this end, the plastic profile comprises embedded, non-combustible fibers of carbon, glass, basalt or aramid. In contrast to the sealing section according to the present invention, however, these fibers are not visible but enclosed by the matrix material in such a manner that they are covered. Therefore the fibers are not located on a decorating portion.

DE 26 23 316 C3 discloses a profile strip. The profile strip comprises a mounting portion and a sealing portion. A covering layer is provided on the mounting portion and on the sealing portion. The mounting portion and the sealing portion are made of durable plastic. The covering layer, however, is made of foam rubber. The covering layer is provided with a coating of flock or textile material.

EP 2 290 020 A1 discloses a noise-reducing sliding coating and a manufacturing process therefor. The aim is to avoid the stick-slip effect. The sliding coating is generated by applying an adhesive and by subsequent electrostatic flocking.

Each of the aforementioned profile sections has at least one portion which imitates a textile-like surface. Practice has shown that such decorating portions are sensitive to mechanical stress, in particular abrasion. Although the mechanical resilience can be increased by a thicker finish layer, this comes at the price of significant loss of texture, i.e. a reduction of haptic and visual depth. The reduction of haptic and visual depth is undesirable. Furthermore, an additional process step is necessary for flocking, which also requires an additional machine.

It is the object of the present invention to provide a profile section that has a visually appealing surface and is relatively insensitive to mechanical stress.

This object is solved by the subject matter of the claims 1 and 10. Preferred embodiments of the profile section are subject of the claims 2 to 9. Preferred embodiments of the manufacturing process are subject of the claims 11 to 15.

SUMMARY OF THE INVENTION

The invention provides a profile section, in particular for a motor vehicle, comprising a decorating portion, which is composed of a fiber composite material. The fiber composite material comprises an elastomer matrix made of a first elastomer and flock fibers. Each of the flock fibers has a fiber length which is comprised of a first length and a second length. In addition, each of the flock fibers has one matrix portion embedded in the elastomer matrix and one exposed portion protruding from the elastomeric matrix. The matrix portion has the first length and the exposed portion has the second length.

The flock fibers protrude with the exposed portion from the elastomer matrix. The flock fibers produce the textile-like visual appearance and haptic properties—both together are also called texture—of a textile-like surface. The flock fibers are in particular embedded to a large extent with the matrix portion in the elastomer matrix. Thus the flock fibers are firmly positioned and accordingly do not get detached from the decorating portion under normal mechanical stress, for example due to rubbing. The profile section according to the present invention has an attractive visual appearance and is relatively insensitive to mechanical stress such as abrasion, for instance.

The fiber composite material is in particular extrudable. 'Extrudable' here means that the fiber composite material can be extruded or coextruded. The fiber composite material is also suitable for injection molding. The first elastomer and the flock fibers are favorably mixed before the extrusion or injection molding to the fiber composite material. Alternatively, the mixing takes place during the extrusion. Thus subsequent flocking can be omitted.

Preferably, the profile section comprises a mounting portion for mounting the profile section and/or a sealing portion. If it is provided with a sealing portion, the profile section can be used as sealing profile. The mounting portion facilitates mounting the profile section to the motor vehicle. In addition, due to the elastomer matrix, the decorating portion may be directly molded on the mounting portion and/or the sealing portion. For this, no adhesive is required. Thereby, material consumption in the production is reduced compared to similar sealing profiles, and at the same time, the environmental sustainability of the production is increased, too.

It is preferred that the decorating portion comprises elevations, each having a first cusp and a height, and depressions, each having a second cusp, wherein two adjacent elevations have a distance.

The height of the elevations is preferably between 100 µm and 500 µm. The height is preferably measured from a connecting line between two adjacent second cusps to the first cusp, which is located between the adjacent second cusps, orthogonally to the connecting line.

Preferably the distance between two adjacent elevations is between 500 µm and 1 mm. The distance is preferably measured from the first cusp of an elevation to the first cusp of the other elevation.

Further preferably, the elevations and depressions are formed in such a way that the flock fibers protrude from the elastomer matrix at an angle. The angle is measured between the exposed portion, which forms the first leg of the angle, and the tangent plane, which forms the second leg of the angle, to the surface of the decorating portion at the point where the flock fiber protrudes from the elastomer matrix. In particular, the angle is an acute angle.

In these preferred embodiments, the visual appearance and haptic properties of the decorating portion can mimic different textile-like surfaces. In addition, the elevations and depressions facilitate a simpler protrusion of the flock fibers, so that the visual and haptic surface depth increase. The various dimensions of the elevations permit an adaptation of the texture to the desired application.

In addition, preferably the first elastomer is selected from a group comprising ethylene-propylene-diene rubber (EPDM) and a thermoplastic elastomer (TPE), in particular a thermoplastic vulcanizate (TPV) or a styrene block copolymer (TPS). The first elastomer preferably has a Shore A hardness of 50 ShA to 85 ShA and in particular a Shore A hardness of 50 ShA to 80 ShA. The first elastomer may be dyed as desired.

Preferably, the mounting portion is formed by a second elastomer. Preferably the sealing portion is formed by a third elastomer. The second elastomer and/or the third elastomer is preferably selected from a group comprising ethylene-propylene-diene rubber (EPDM) and a thermoplastic elastomer (TPE), in particular a thermoplastic vulcanizate (TPV) or a styrene block copolymer (TPS). The second elastomer and/or the third elastomer preferably have a Shore A hardness of 50 ShA to 85 ShA and in particular a Shore A hardness of 50 ShA to 80 ShA. The second elastomer and/or the third elastomer may be dyed as desired.

Due to the various types of elastomers, the mounting portion, the sealing portion and the decorating portion can be matched. The various plastic hardnesses also permit determining the visual appearance and haptic properties of the decorating portion as desired. Overall, the scope of the profile section is thereby extended.

The flock fibers may preferably comprise polyamide fibers, polyethylene fibers, mineral fibers and/or textile fibers. Preferably, the flock fibers have a fiber length between 0.1 mm and 5 mm. Preferably, the flock fibers have a refinement of 0.1 dtex to 30 dtex. Preferably, the first length is greater than the second length. In particular, the first length is more than 70%, more preferably more than 90%, of the fiber length. The flock fibers can be dyed as desired.

The various types of flock fibers permit the imitation of further textile-like surfaces. The texture can be adapted to a broader scope of applications.

Further preferably, the decorating portion has a finish coating. Particularly preferably, the finish coating includes a structured finish that contains in particular particles. The finish coating can be dyed as desired.

The resilience of the decorating portion to mechanical stress can be further increased by additionally applying a finish layer onto the decorating portion. Further, a structured finish facilitates a greater visual and haptic depth.

The profile section explained above is produced by generating a decorating portion from a fiber composite material in step a). The decorating portion is in particular generated by extrusion or injection molding. The fiber composite material comprises an elastomer matrix formed of a first elastomer and flock fibers. The decorating portion is generated in such a manner that each of the flocking fibers has a fiber length which is composed of a first length and a second length and comprises a matrix portion embedded in the elastomer matrix and an exposed portion protruding from the elastomer matrix. The matrix portion has the first length and the exposed portion has the second length.

Preferably, the fiber composite material is mixed from the first elastomer and the flock fibers prior to the extrusion. Alternatively, the fiber composite material is mixed from the first elastomer and the flock fibers during the extrusion. Thus subsequent flocking can be omitted.

Preferably, in step b), a mounting portion and/or a sealing portion are generated. The mounting portion and/or the sealing portion are generated in particular by extrusion or injection molding.

It is preferred that in step c), the decorating portion is provided with elevations in such a manner that each of the elevations has a first cusp and a height, and with depressions in such a manner that each of the depressions has a second cusp, wherein two adjacent elevations have a distance.

Preferably, in step d), the decorating portion is provided with a finish coating containing in particular a structured finish or a sliding finish. The structured finish may contain particles.

Preferably either
I) the steps a) and b) or
II) the steps a) and c) or
III) the steps b) and c) or
IV) the steps a), b) and c)
are executed consecutively without any intermediate step, or in particular simultaneously. It is also preferred that step d) is executed without any intermediate step subsequently to, in particular simultaneously with, one of the alternatives I) to IV).

BRIEF DESCRIPTION OF THE DRAWING FIGURES

Embodiments of the invention will be explained hereinafter in reference to the attached figures.

DETAILED DESCRIPTION OF THE INVENTION

Figure 1:
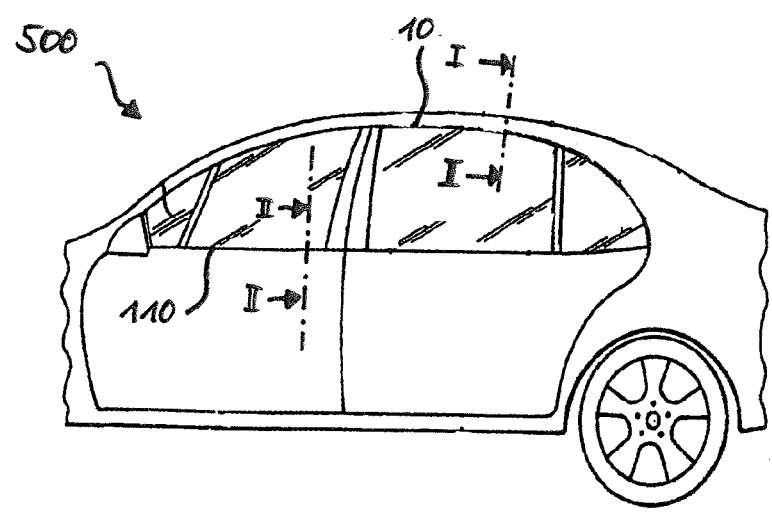
FIG. 1 is a lateral partial view of a motor vehicle.

According to FIG. 1, a motor vehicle 500 comprises a sealing section 10 which is arranged in the interior at the upper side of a door opening. The sealing section 10 covers the transition to the roof lining.

Figure 2:
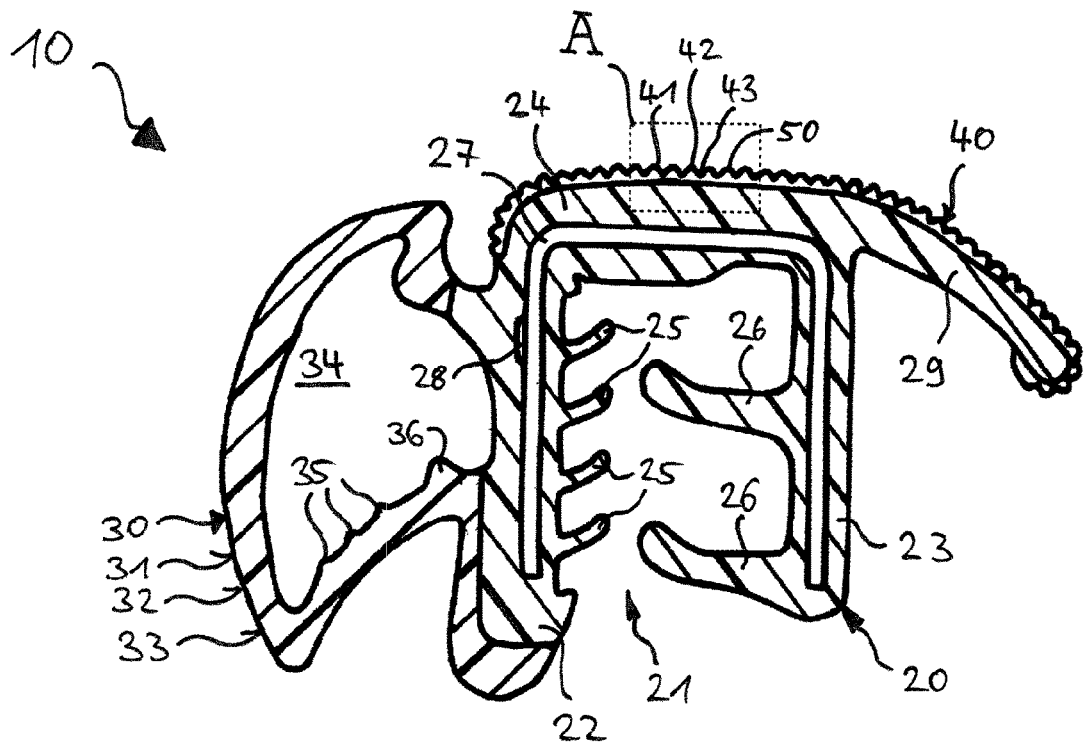
FIG. 2 is a cross section along the line I-I of a first embodiment of the profile section.

As shown in FIG. 2, the sealing section 10 according to the first embodiment comprises a mounting portion 20, a sealing portion 30, and a decorating portion 40.

The mounting portion 20 is made of TPE. The mounting portion 20 has a receiving portion 21 for receiving a protrusion of the motor vehicle 500. The receiving portion 21 is bounded by a first leg 22, a second leg 23 and a base portion 24. The first and second legs 22, 23 are arranged at ends of the base portion 24 distant from one another and extend essentially parallel in the same direction. A first reinforcement 27 and a second reinforcement 28 are embedded in the mounting portion 20.

At the first leg 21 four outer fixing lips 25 are arranged which extend into the receiving portion 21 in direction towards the second leg 23. At the second leg 23 two inner fixing lips 26 are arranged which extend into the receiving portion 21 in direction towards the first leg 21. At the base portion 24 a decorating lip 29 is arranged, which extends from the base portion 24 in a direction away from the base portion 24.

The first reinforcement 27 is essentially U-shaped and embedded in the first leg 22, the second leg 23, and the base portion 24. The second reinforcement 28 is embedded in the first leg 22 on the side facing the sealing portion 30.

When the receiving portion 21 receives a protrusion of the motor vehicle 500, the outer and inner fixing lips 25, 26 are propped against the protrusion and prevent a removal of the sealing section 10. The first reinforcement 27 additionally forces the inner and outer fixing lips 25, 26 against the protrusion so that a higher holding power is created.

The sealing portion 30 is made of EPDM. The sealing portion 30 has a sealing surface 31 which is facing away from the mounting portion 20. The sealing surface 31 comprises a flocking layer 32 made of flock. In addition, the flocking layer 32 is provided with a sliding finish layer 33. The sealing portion 30 and a portion of the first leg 22 together define a cavity 34. Three first protrusions 35, which are arranged on one leg of the sealing portion 30, project into the cavity 34. A second protrusion 36 is located at an end of the leg which is facing towards the mounting portion 20. The second protrusion 36 is larger and projects further into the cavity 34 than the first protrusions 35.

The decorating portion 40 is arranged at the mounting portion 20. The decorating portion 40 has a visible surface 41, which can be seen by a viewer when fitted. The visible surface 41 is provided with elevations 42 and depressions 43. The decorating portion 40 is made from a fiber blend. The fiber blend has an elastomeric matrix of EPDM and flock fibers 50 made of polyamide embedded therein. The decorating portion 40 is provided with a finish layer 47. The finish layer 47 contains a structured finish containing particles.

Figure 3:
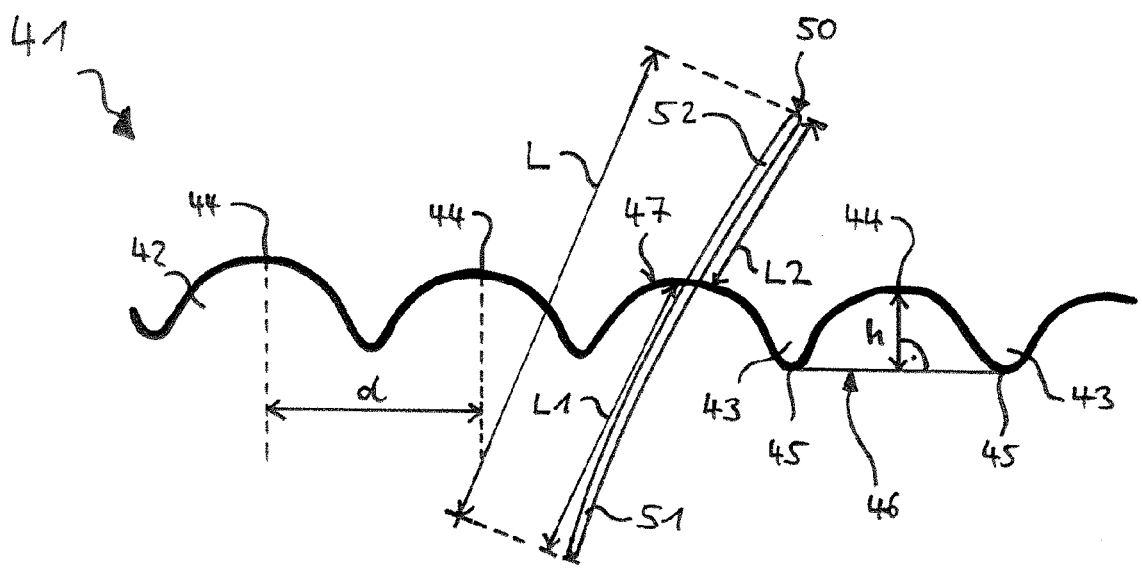
FIG. 3 is an enlarged view of the area A from FIG. 2.
Figure 4:
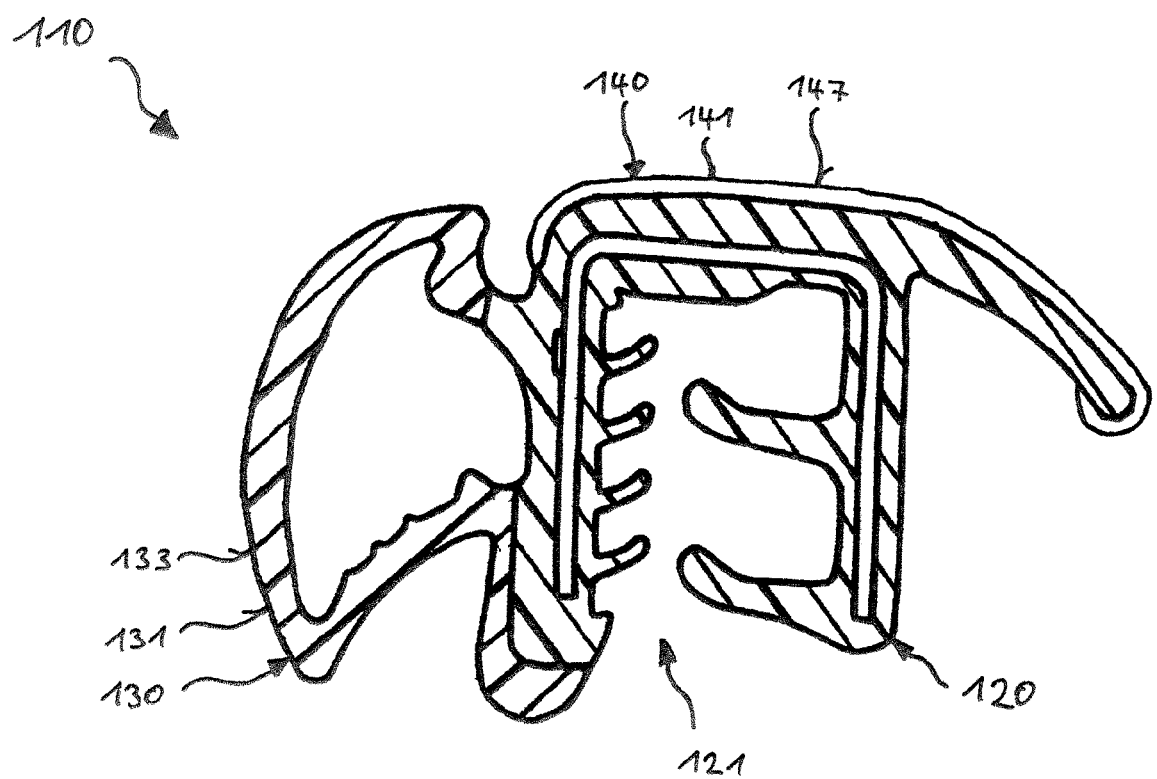
FIG. 4 is a cross section along the line II-II of a second embodiment of the profile section.

As shown in FIG. 3, the elevations 42 have first cusps 44, and the depressions 43 have second cusps 45. For the sake of clarity, only the first and second cusps 44, 45, which are essential for the explanation, are shown in FIG. 4.

Two adjacent second cusps 45 are connected by a connecting line 46. The examined elevation 42 has a height h. The height h is the orthogonal distance between the first cusp 44 of the examined elevation 42 and the connecting line 46. The height h of the elevation 42 is between 100 μm and 500 μm.

Two adjacent elevations 42 have a distance d from one another. The distance d is the shortest distance between the respective first cusps of the two adjacent elevations 42. The distance d is between 500 μm and 1 mm.

FIG. 3 further displays in a schematic manner one of the flock fibers 50. The flock fiber 50 has a matrix portion 51, an exposed portion 52, and a fiber length L. The matrix portion 51 is embedded in the elastomeric matrix and has a first length L1. The exposed portion 52 protrudes from the elastomeric matrix and has a second length L2. The first length L1 is greater than the second length L2. The second length L2 is 15 μm.

The sealing section 10 is produced by means of extrusion. To this end, first the first and second reinforcement 27, 29 are provided. In a single process, the mounting portion 20, the sealing portion 30, and the decorating portion 40 are coextruded around the first and second reinforcement 27, 29. The mounting portion 20 is extruded of a TPE. The sealing portion 30 is extruded of EPDM. The decorating portion 40 is extruded of the fiber mixture that contains an elastomeric matrix of EPDM and flock fibers 50 made of polyamide embedded therein. The decorating portion 40 is provided with the finish coating 47, which includes a structured finish.

The motor vehicle 500 further comprises a sealing section 110 according to a second embodiment, which is shown in FIG. 4. The sealing section 110 is provided as a window slot sealing.

The sealing section 110 comprises a mounting portion 120, a sealing portion 130, and a decorating portion 140.

The mounting portion 120 is made of EPDM. The mounting portion 120 has a receiving portion 121 for receiving a protrusion of the motor vehicle 500. For the rest, the mounting portion 120 is identical to the mounting portion 120.

The sealing portion 130 is made of TPS. The sealing portion 130 has a sealing surface 131 which is facing away from the mounting portion 120. The sealing surface 31 comprises a sliding finish layer 133. For the rest, the sealing portion 130 is identical to the sealing portion 30.

The decorating portion 140 is arranged at the mounting portion 120. The decorating portion 140 has a visible surface 141. The visible surface 141 can be seen, like visible surface 41 of the first embodiment, by a viewer when fitted. The decorating portion 140 is made from a fiber blend. The fiber blend has an elastomeric matrix of TPV and flock fibers made of polyethylene embedded therein. The decorating portion 140 is provided with a finish layer 147. The finish layer 147 contains a sliding finish. For the rest, the decorating portion 140 is identical to the decorating portion 40.

The sealing section 110 is produced by means of extrusion. To this end, first the first and second reinforcement 27, 29 are provided. In a single process, the mounting portion 120, the sealing portion 130, and the decorating portion 140 are coextruded around the first and second reinforcement 27, 29. The mounting portion 120 is extruded of an EPDM. The sealing portion 130 is extruded of TPS. The decorating portion 140 is extruded of the fiber mixture that contains an elastomeric matrix of TPV and flock fibers made of polyethylene embedded therein. The decorating portion 140 is provided with the finish coating 147, which contains a sliding finish.

Through the sealing section according to the present invention, the visual appearance and the haptic properties of textiles, woven fabrics, or knitted fabrics can be emulated. The use of the fiber blend is much less expensive than a lamination of the profile section with textile materials. Compared to the previously existing textile-like decorating portions, in the sealing section according to the present invention, a distinct fabric texture can be emulated which is in addition relatively insensitive to mechanical stress such as abrasion.

REFERENCE LIST

| | |
|---|---|
| 10 | sealing section |
| 20 | mounting portion |
| 21 | receiving portion |
| 22 | first leg |
| 23 | second leg |
| 24 | base portion |
| 25 | outer fixing lip |
| 26 | inner fixing lip |
| 27 | first reinforcement |
| 28 | second reinforcement |
| 29 | decorating lip |
| 30 | sealing portion |
| 31 | sealing surface |
| 32 | flocking layer |
| 33 | sliding finish layer |
| 34 | cavity |
| 35 | first protrusion |
| 36 | second protrusion |
| 40 | decorating portion |
| 41 | surface |
| 42 | elevation |
| 43 | depression |
| 44 | first cusp |
| 45 | second cusp |
| 46 | connecting line |
| 47 | finish coating |
| 50 | flock fiber |
| 51 | matrix portion |
| 52 | exposed portion |
| 110 | sealing section |
| 120 | mounting portion |
| 121 | receiving portion |
| 130 | sealing portion |
| 131 | sealing surface |
| 133 | sliding finish layer |
| 140 | decorating portion |
| 141 | surface |
| 147 | finish coating |
| 500 | motor vehicle |
| h | height |
| d | distance |
| L | fiber length |
| L1 | first length |
| L2 | second length |

The invention claimed is:

1. A method for manufacturing a profile section having a mounting portion for mounting the profile section to a motor vehicle and a decorating portion comprising the steps of:
   a) extruding a mixture of a first elastomer and flock fibers for forming the decorating portion with elevations and depressions in a visible surface of the decorating portion, wherein the extruded first elastomer forms an elastomeric matrix within which the flock fibers are embedded in a way that the flock fibers have a fiber length composed of a first length that is embedded within the elastomeric matrix and a second length that protrudes from the elastomeric matrix for creating textile-like optics and haptic, wherein the first length is longer than the second length;
   b) forming the mounting portion; and
   c) arranging the decorating portion on the mounting portion.

2. The method of claim 1, including a step of mixing the first elastomer and the flock fibers before the step of extruding the mixture.

3. The method of claim 1 in which the step of forming the mounting portion includes a step of coextruding the mounting portion together with the decorating portion.

4. The method of claim 1 in which the step of extruding includes a step of forming the elevations and depressions as variations in a thickness of the elastomeric matrix.

5. The method of claim 1 further comprising a step of:
   d) providing the decorating portion with a coating comprising at least one of a textured coating and a sliding coating.

6. The method of claim 1 including a step of mixing the first elastomer and the flock fibers during the step of extruding the mixture.

7. The method of claim 1 in which first length that is embedded within the elastomeric matrix is more that 90% of the fiber length of the flock fibers.

8. The method of claim 3 in which the mounting portion is coextruded from a second elastomer that is different from the first elastomer.

9. The method of claim 3 in which the mounting portion is coextruded around a reinforcement.

10. The method of claim 9 in which the step of coextruding includes coextruding the mounting portion together with a sealing portion having a surface facing away from the mounting portion.

11. The method of claim 4 in which the step of forming the elevations and depressions as variations in a thickness of the elastomeric matrix includes forming the elevations with a first cusp and a height, respectively, and forming the depressions with a second cusp, respectively, wherein the first cusps of two neighboring elevations are separated by the second cusp of one of the depressions.

12. The method of claim 11 in which the height is measured orthogonal to a connecting line between the second cusps of two neighboring depressions to the elevation one of the first cusps that is disposed between the second cusps of the two neighboring depressions, and the height is between 10 µm and 500 µm.

13. The method of claim 12 in which a distance between the first cusps of the two neighboring elevations is between 500 µm and 1 mm.

14. The method of claim 5 in which the step of providing the decorating portion with a coating includes forming the coating with a structured finish containing particles.

* * * * *